United States Patent [19]

Maruta

[11] Patent Number: 4,739,237
[45] Date of Patent: Apr. 19, 1988

[54] PLL MOTOR CONTROLLER

[75] Inventor: Shuichiro Maruta, Yokohama, Japan

[73] Assignee: Kabushiki Kaisha Toshiba, Kawasaki, Japan

[21] Appl. No.: 896,151

[22] Filed: Aug. 13, 1986

[30] Foreign Application Priority Data

Aug. 13, 1985 [JP] Japan .................................. 60-176872

[51] Int. Cl.$^4$ .............................................. G05B 1/02
[52] U.S. Cl. ...................................... 318/608; 318/603
[58] Field of Search ................ 318/314, 318, 606, 608

[56] References Cited

U.S. PATENT DOCUMENTS

| | | | |
|---|---|---|---|
| 3,989,931 | 11/1976 | Phillips | 235/92 FQ |
| 4,002,962 | 1/1977 | Miller | 318/329 |
| 4,278,925 | 7/1981 | Minakuchi | 318/314 |
| 4,500,822 | 2/1985 | Tajima et al. | 318/314 |
| 4,543,516 | 9/1985 | Kobori et al. | 318/318 |

FOREIGN PATENT DOCUMENTS 0104931 4/1984 European Pat. Off. .
0118783 9/1984 European Pat. Off. .

OTHER PUBLICATIONS

Patent Abstracts of Japan, vol. 8, No. 190, No. 59-80178; 9-5-1984.

Primary Examiner—William M. Shoop, Jr.
Assistant Examiner—D. Martin
Attorney, Agent, or Firm—Schwartz, Jeffery, Schwaab, Mack, Blumenthal & Evans

[57] ABSTRACT

A PLL motor controller in accordance with the present invention comprises a driving system for driving a motor, a reference frequency generator for generating pulses with reference frequency that corresponds to the speed of motor rotation to be set, a counter which is run freely at the reference frequency from the reference frequency generator, a pulse generator for generating sampling pulses with a timing that responds to the actual rotation speed of the motor based on the pickup signal from the driving system, a latch circuit for latching a digital information in the counter at the timing of sending the sampling pulses from the pulse generator, and a D/A converter for analog-converting the digital information in the counter that is latched and for supplying the result to the driving system. The driving system is constructed so as to drive the motor to be rotated with a set speed of rotation according to the error signal from the D/A converter.

6 Claims, 6 Drawing Sheets

| FIG.4 |
|---|
| FIG.4A |
| FIG.4B |
| FIG.4C |

PLL MOTOR CONTROLLER

BACKGROUND OF THE INVENTION

1. Field of the Invention

The present invention relates to phase locked loop (PLL) and a motor controller that makes use of it, in particular to a PLL motor controller for controlling the speed of the motor by the use of digital PLL.

2. Description of the Prior Art

As a PLL motor controller of the above kind, there has been known in the past, for example, a PLL phase detector (commercial name: MC-4044) made by Motorola Corp. in the United States, as shown in FIG. 1. This device is constructed as follows. Namely, the device receives a clock with reference frequency (referred to as the reference pulse hereafter) that corresponds to the speed of the motor rotation that is to be set and a clock with timing that corresponds to the rotation speed of the motor (referred to as FG pulse hereafter) in the terminals R and V, respectively. Then, two error signals that have waveforms of a kind of pulse width modulated (PWM), are output from terminals U and D of the device and are converted to an analog quantity by a charge pump. The signals are smoothed next by an integrator to be sent out to a motor driving system.

In such a configuration, an error signal that is analog-converted is added with a loop delay which is introduced due to the constants C and R that exist in the charge pump or the integrator. Because of this, when the motor is lightly loaded or has a low inertia, in particular, it has been difficult to control the motor with satisfactory response to the rotation speed to be set and also it has been difficult to control the gain of the phase to voltage ratio (P/V ratio).

Moreover, if there are included constants C and R in the PLL circuit, then that PLL circuit is not suited for a monolithic integration of the circuit.

SUMMARY OF THE INVENTION

An object of the present invention is to provide a PLL motor controller which does not require circuit means that includes CR constants.

Another object of the present invention is to provide a PLL motor controller which permits to accomplish a completely monolithic integration circuit.

Another object of the present invention is to provide a PLL motor controller which makes it possible to control the motor to predetermined rotation speed with satisfactory response, even when use is made of a motor with any load and inertia.

Another object of the present invention is to provide a PLL motor controller which is capable of adequately and freely controlling the resolution and the precision of the P/V gain with a counter and a D/A converter.

A feature of the present invention is that a PLL motor controller comprises a counter that is run freely at the reference frequency to be set, a pulse generator for generating a sampling pulse that serves as a comparative input signal, a latch circuit for latching a digital information in the counter with a sending timing of the sampling pulses, when the sampling pulse is in a condition which is pulled in to the input signal with the reference frequency, and a D/A converter for analog-converting the digital information in the latched counter.

Another feature of the present invention is that in the PLL motor controller, there is constructed a motor speed control system which includes a counter that is run freely at the reference frequency that corresponds to the speed of motor rotation to be set, a pulse generator for generating sampling pulses with a timing that responds to the actual rotation speed of the motor a latch circuit which, when the sampling pulse is pulled in to the input signal that has reference frequency, latches the state in the counter at the sending timing of the sampling pulses, and a D/A converter for analog-converting the digital information that is in the state in the latched counter.

These and other objects, features and advantages of the present invention will be more apparent from the following description of a preferred embodiment, taken in conjunction with the accompanying drawings.

DESCRIPTION OF THE PREFERRED EMBODIMENT

Figure 2:
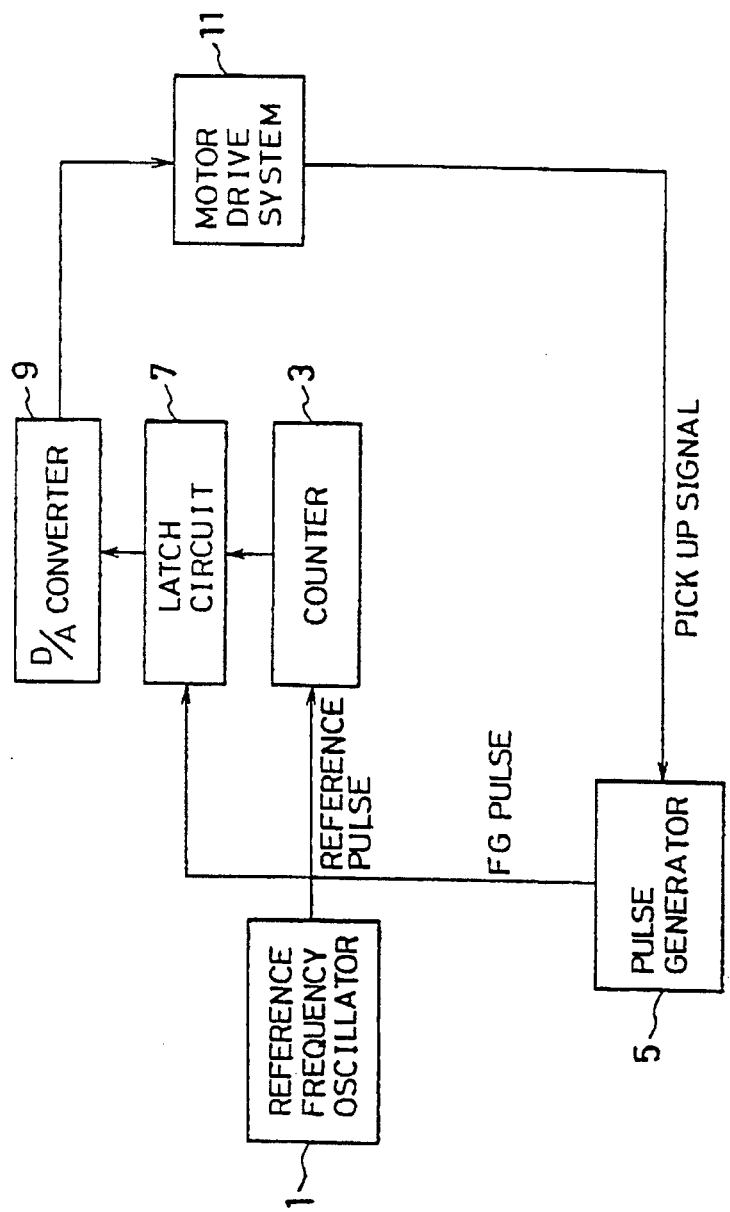
FIG. 2 is a block diagram for illustrating a simplified structure of a PLL motor controller embodying the present invention.

Referring to FIG. 2, a PLL motor controller embodying the present invention is shown with reference numeral 2. The PLL motor controller 2 comprises a reference frequency generator 1, a counter 3, a pulse generator 5, a latch circuit 7, a D/A converter 9, and a motor driving system 11.

The reference frequency generator 1 outputs a pulse (referred to as the reference pulse) with reference frequency that corresponds to the revolutions per minute of the motor to be set, and the counter 3 is run freely with the reference frequency by receiving the reference pulse from the reference frequency generator 1.

On the other hand, the pulse generator 5 generates an FG pulse with timing that responds to the actual rotation speed of the motor, by receiving from the motor driving system 11 a pickup signal which is proportional to the actual r.p.m. of the motor. The FG pulse becomes a comparative input signal in the PLL.

When an FG pulse generated in this manner in the pulse generator 5 is input to the latch circuit 7, if the FG pulse is in a condition to be drawn to the reference frequency, the state in the counter 3 is latched in the latch circuit 7 with the sending timing of the FG pulse.

At the same time, the digital information of the state shown in the latch counter 3 is analog-converted in the D/A converter 9 and is sent to the motor driving system 11 as a phase error signal.

Figure 1:
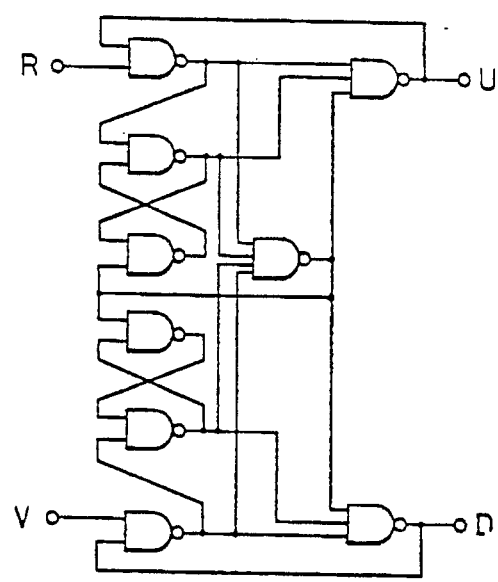
FIG. 1 is a diagram for illustrating a prior PLL motor controller.
Figure 3:
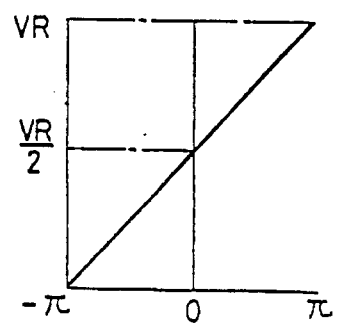
FIG. 3 is a graph for showing the phase difference and error signal characteristics in the PLL motor controller shown in FIG. 2.

Namely, by means of the counter 3, the pulse generator 5, the latch circuit 7, and the D/A circuit 9, DC current that corresponds to the phase difference between the reference pulse and the FG pulse, for a range from a phase delay of $-\pi$ to a phase lead of $+\pi$, with the reference frequency as the center, is obtained as shown in FIG. 3. It is to be noted that FIG. 3 shows the case for the phase difference of zero.

In the motor driving system, the motor is driven and adjusted so as to be rotated at a set rotation speed, based on the input error signal. A pickup signal is sent from the motor driving system 11 to the pulse generator 5, as mentioned earlier. Therefore, the timing for sending the FG pulse from the pulse generator 5 is changed toward the direction in which it coincides with the sending timing of the reference pulse.

Figure 4A:
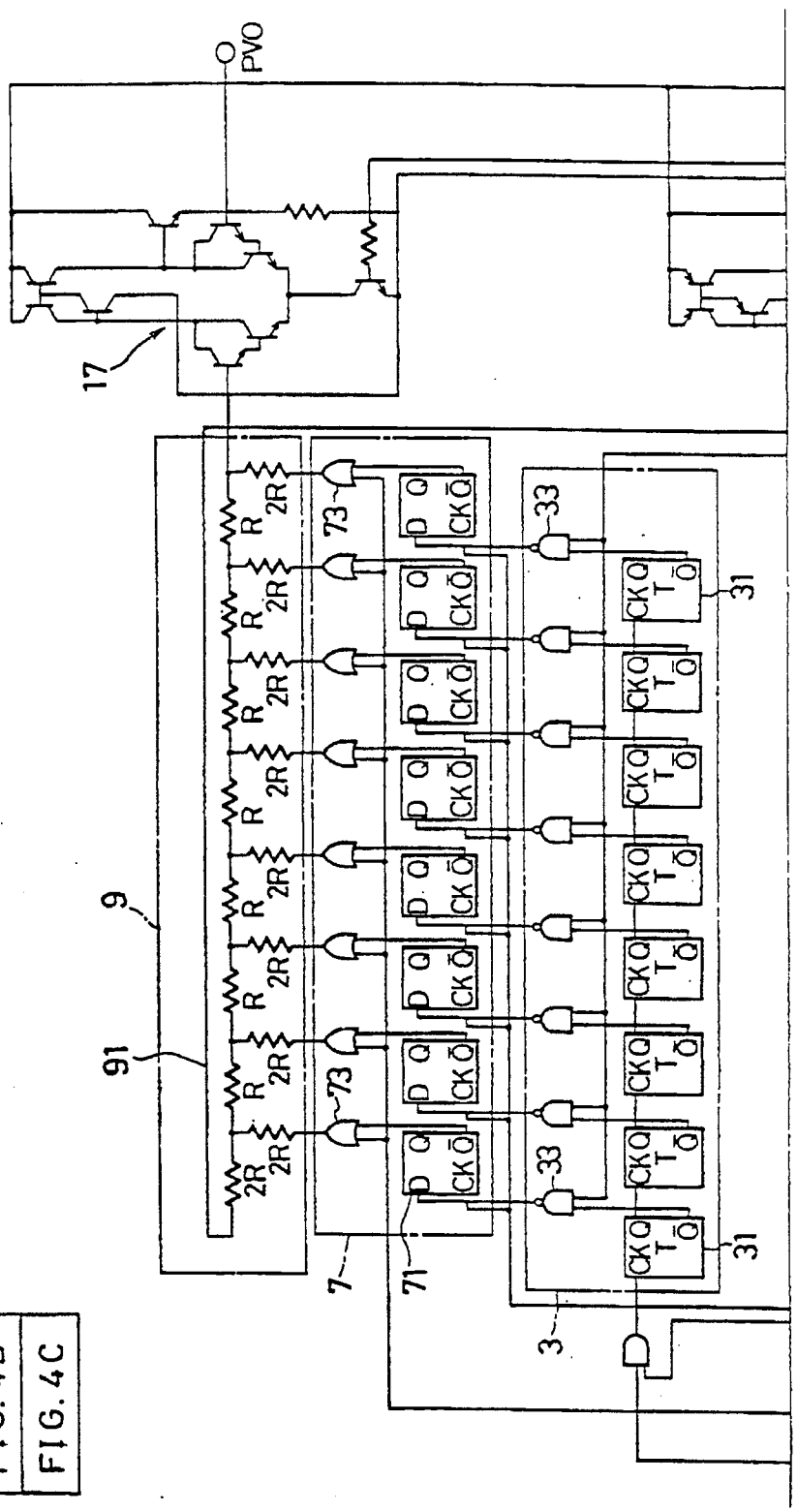
FIG. 4 is a circuit diagram for showing the concrete construction of the PLL motor controller shown in FIG. 2.
Figure 4B:
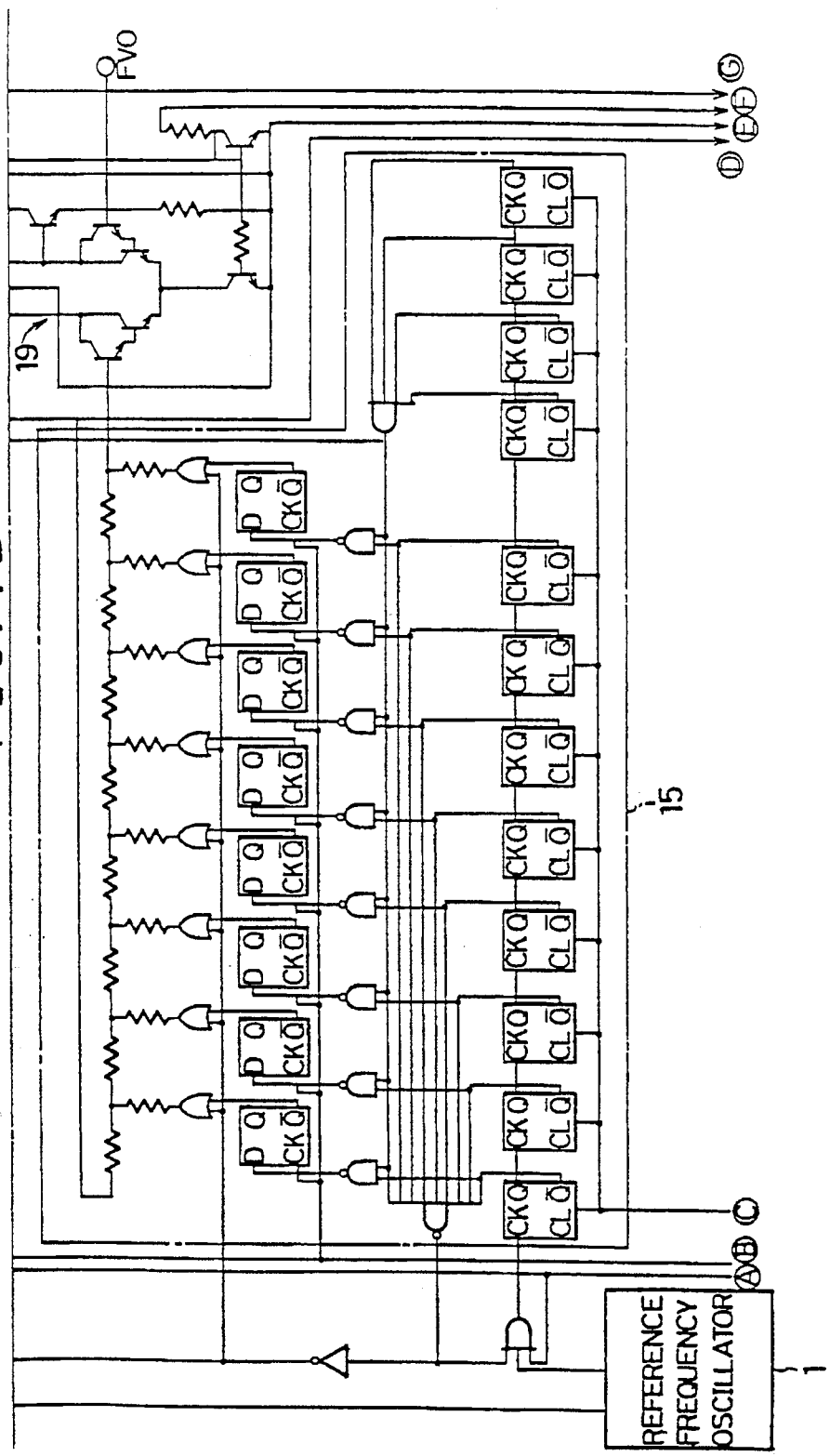
Figure 4C:
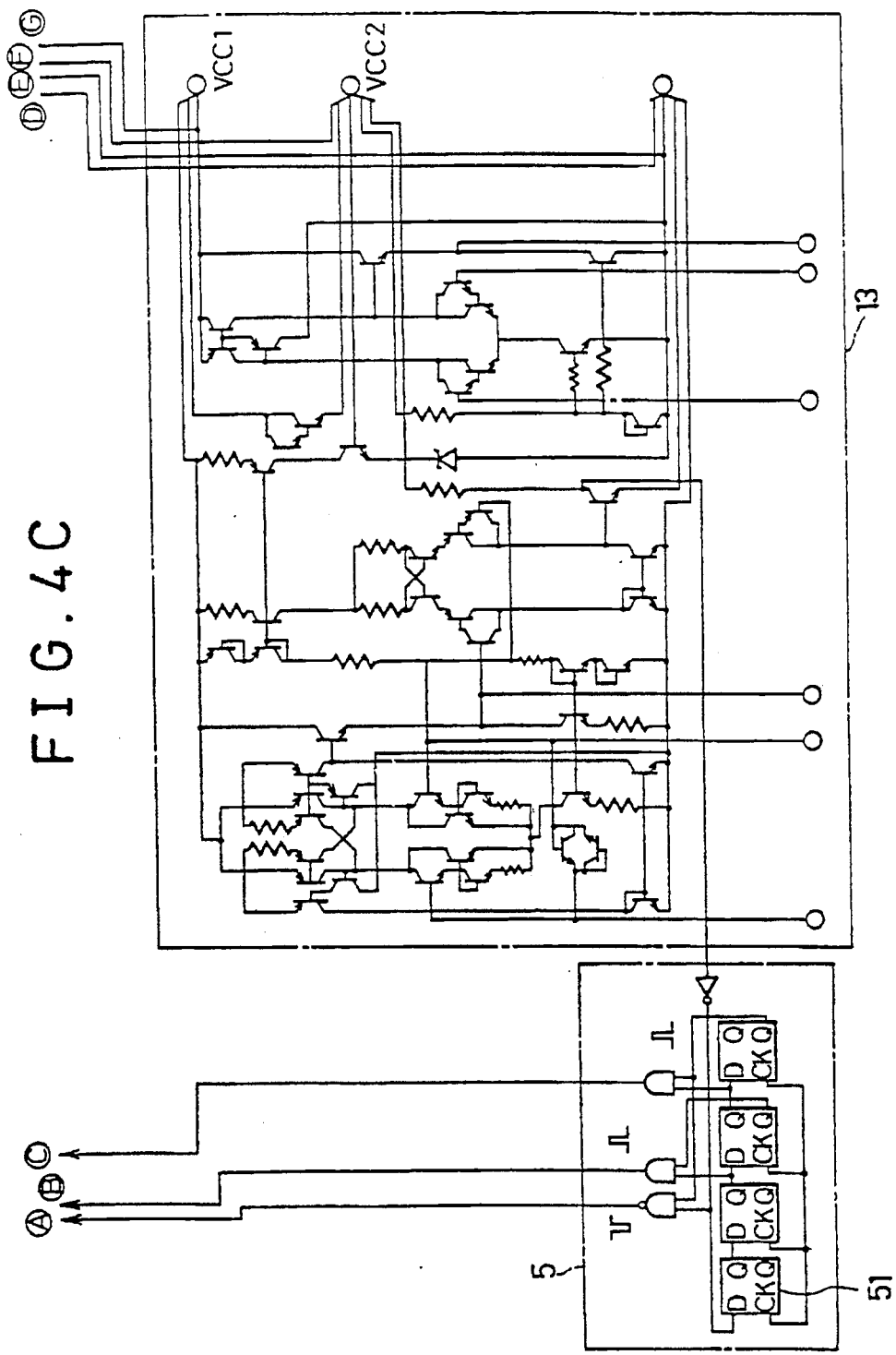

In the present embodiment of the invention, there are provided eight-stage T flip-flops 31 in the counter 3, as shown in FIG. 4. In each stage of the T flip-flops 31, the reference frequency is run freely, for example, by eight bits. In each stage, the reset output is applied to one of the input terminals of the corresponding NAND gate 33.

In the pulse generator 5, there are provided four-stage D flip-flops 51. The pulse generator 5 receives the pickup signal from the motor driving system 11 that is amplified in the amplifier 13, and generates an FG pulse as well as a system reset signal SR and a signal OVER.

In the latch circuit 7, there are provided eight-stage D flip-flops 71, and the FG pulse is received by the CK terminal of each of the D flip-flops 71. Further, the D terminal of each of the D flip-flops 71 is connected to the output terminal of each of the corresponding NAND gate 33 of the counter 3. Therefore, when a voltage that corresponds to the reference frequency is generated in an FV converter 15 that is connected to the other input terminal of each of the NAND gates 33, the eight-bit digital information that is shown in the counter 5 with a sending timing of the FG pulse, is applied via the NAND gates 33 to the D terminals of the D flip-flops 71, is latched in the D flip-flops 71, and is sent to the D/A converter 9 from OR gates 73.

The D/A converter 9 consists of eight-stage ladder resistors 91, and an eight-bit digital information that is latched in the latch circuit 7 is analog-converted directly by means of the ladder resistors 91.

Since the error signal that is analog-converted is obtained by the ladder resistors 91 that have relatively high resistance, it is sent via a buffer amplifier 17 to the motor driving system 11 for impedance matching. Moreover, the output of the FV converter 15, too, is sent to the motor driving system 11 via a buffer amplifier 19 for impedance matching.

In this way, the motor driving system 11 adjusts the speed of motor rotation.

In the motor driving system 11, the number of motor rotations is monitored, for example, optically or magnetically to obtain a pickup signal. The pickup signal is amplified by the amplifier 13, applied to the ensuing pulse generator 5, and and FG pulse from the pulse generator 5 is applied to the latch circuit.

In summary, with a motor controller that adopts a PLL of the present invention, it becomes possible to obtain a DC voltage that is to be applied to the motor driving system directly from the reference clock and the FG clock. Therefore, there can be formed a digital PLL that does not require a means that contains CR constants.

Consequently, a PLL motor controller of the present invention is a device which makes it possible to accomplish a complete monolithic integration of the circuit for a PLL circuit. Moreover, no loop delay is involved so that even when it is applied to a motor with whatever load and inertia, it becomes possible to control the motor, with a satisfactory response, to a speed of rotation to be set.

Moreover, the resolution and the precision of the P/V gain in the PLL circuit can be controlled adequately and freely by means of a counter and a D/A converter.

Various modifications will become possible for those skilled in the art after receiving the teachings of the present disclosure without departing from the scope thereof.

What is claimed is:

1. A PLL motor controller for controlling a motor to a predetermined speed of rotation, comprising:
   (a) a driving system for driving the motor;
   (b) a reference frequency generator for generating pulses with reference frequency that corresponds to the predetermined speed of motor rotation;
   (c) a counter which is run freely at the reference frequency from said reference frequency generator;
   (d) a pulse generator for generating sampling pulses with a timing that responds to the actual rotation speed of the motor according to the pickup signal from said driving system;
   (e) a latch circuit for latching the digital information in said counter at the sending timing of said sampling pulse from said pulse generator; and
   (f) a D/A converter for supplying said digital information in said latched counter to said driving system as a phase error signal by analog-converting the information, wherein
   (g) said driving system is constructed for driving the motor so as to rotate the motor at the predetermined speed of rotation, according to the error signal from said D/A converter; and
   said counter comprises a plurality of stages of T flip-flops, said pulse generator comprising a plurality of stages of D flip-flops, said latch circuit comprising a plurality of stages of D flip-flops, and said D/A converter comprising a plurality of stages of ladder resistors.

2. A PLL motor controller as claimed in claim 1, in which the phase difference signal that is supplied from said D/A converter is a DC voltage signal that corresponds to the difference in the phases of the reference frequency pulse and the sampling pulse from said pulse generator, for a range of phase from a delay of $-\pi$ to a lead of $+\pi$ with the reference frequency pulse from said reference frequency generator as the center.

3. A motor rotation speed controlling system in a PLL motor controller which has a driving system for driving a motor so as to be rotated with a set speed of rotation, comprising:
   (a) a reference frequency generator for generating pulses with reference frequency that corresponds to the speed of motor rotation to be set;
   (b) a counter which is run freely at the reference frequency from said reference frequency generator;
   (c) a pulse generator for generating sampling pulses with a timing that responds to the actual rotation speed of the motor according to the pickup signal from the driving system;
   (d) a latch circuit for latching the digital information in said counter with sending timing of the sampling pulses from said pulse generator; and
   (e) a D/A converter for analog-converting the digital information in said counter that is latched, and for supplying the result to the driving system as a phase error signal;
   wherein said counter comprises a plurality of stages of T flip-flops, said pulse generator comprising a plurality of stages of D flip-flops, said latch circuit comprising a plurality of stages of D flip-flops, and said D/A converter comprising a plurality of stages of ladder resistors.

4. A PLL motor controller as claimed in claim 3, in which the phase difference signal that is supplied from said D/A converter is a DC voltage signal that corresponds to the difference in phases of the reference frequency pulse and the sampling pulse from said pulse generator, for a range of phase from a delay of $-\pi$ to a lead of $+\pi$ with the reference frequency pulse from said reference frequency generator as the center.

5. A phase-locked loop, comprising:
(a) a pulse generator for generating a sampling pulse that serves as a comparative input signal;
(b) a reference frequency generator for generating pulses with reference frequency;
(c) a counter which is run freely at the reference frequency from said reference frequency generator;
(d) a latch circuit for latching a digital information in the counter with a sending timing of the sampling pulses, when the sampling pulse is in a condition which is pulled in to the input signal with the reference frequency; and
(e) a D/A converter for analog-converting the digital information in the latched counter to supply the digital information as a phase error signal;
wherein said counter comprises a plurality of stages of T flip-flops, said pulse generator comprising a plurality of stages of D flip-flops, said latch circuit comprising a plurality of stages of D flip-flops, and said D/A converter comprising a plurality of stages of ladder resistors.

6. A phase-locked loop as claimed in claim 5, in which the phase difference signal that is supplied from said D/A converter is a DC voltage signal that corresponds to the difference in the phases of the reference frequency pulse and the sampling pulse from said pulse generator, for a range of phase from a delay of $-\pi$ to a lead of $+\pi$ with the reference frequency pulse from said reference frequency generator as the center.

* * * * *